United States Patent
Uehori et al.

(10) Patent No.: US 8,027,998 B2
(45) Date of Patent: Sep. 27, 2011

(54) MINUTES PRODUCTION DEVICE, CONFERENCE INFORMATION MANAGEMENT SYSTEM AND METHOD, COMPUTER READABLE MEDIUM, AND COMPUTER DATA SIGNAL

(75) Inventors: Yukiyo Uehori, Minato-ku (JP); Tohru Fuse, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 398 days.

(21) Appl. No.: 11/756,101

(22) Filed: May 31, 2007

(65) Prior Publication Data

US 2008/0133600 A1 Jun. 5, 2008

(30) Foreign Application Priority Data

Nov. 30, 2006 (JP) .................................. 2006-323649

(51) Int. Cl.
G06F 17/30 (2006.01)
(52) U.S. Cl. ..................... 707/796; 707/758; 379/202.01
(58) Field of Classification Search .................. 707/1–3, 707/102, 104.1; 379/202.01
See application file for complete search history.

(56) References Cited

U.S. PATENT DOCUMENTS

| 7,298,930 | B1 * | 11/2007 | Erol et al. ...................... 382/305 |
| 7,363,030 | B2 * | 4/2008 | Chang et al. ................... 455/416 |
| 7,426,191 | B2 * | 9/2008 | Salesky et al. ................ 370/260 |
| 7,606,444 | B1 * | 10/2009 | Erol et al. ...................... 382/305 |
| 7,653,705 | B2 * | 1/2010 | Gudipaty et al. .............. 709/218 |
| 7,810,020 | B2 * | 10/2010 | Omura et al. .................. 715/200 |
| 2003/0197729 | A1 | 10/2003 | Denoue et al. |
| 2007/0074123 | A1 * | 3/2007 | Omura et al. .................. 715/753 |
| 2007/0133437 | A1 * | 6/2007 | Wengrovitz et al. .......... 370/260 |
| 2007/0198637 | A1 * | 8/2007 | Deboy et al. ................... 709/204 |
| 2007/0263082 | A1 * | 11/2007 | Tamaru et al. ............. 348/14.08 |
| 2007/0297643 | A1 * | 12/2007 | Uehori et al. ................. 382/100 |
| 2008/0235018 | A1 * | 9/2008 | Eggen et al. ................... 704/251 |

FOREIGN PATENT DOCUMENTS

| JP | 2002-063290 A | 2/2002 |
| JP | 2004-005598 A | 1/2004 |
| JP | 2004-213153 A | 7/2004 |

* cited by examiner

*Primary Examiner* — Debbie Le
(74) *Attorney, Agent, or Firm* — Sughrue Mion, PLLC

(57) ABSTRACT

A minutes production device includes: a producing unit that produces minutes, based on conference information; a recommending unit that searches a database and recommends information, based on the conference information used by the producing unit to produce the minutes; and an editing unit that edits the minutes, based on the information recommended by the recommending unit.

26 Claims, 21 Drawing Sheets

FIG. 3

CONFERENCE INFORMATION MANAGEMENT

| CONFERENCE ID | CONFERENCE NAME | VENUE | DATE | STARTING TIME | ENDING TIME |
|---|---|---|---|---|---|
| 1 | FIRST CC CONFERENCE | HEADQUARTERS A | 2006/4/1 | 15:00 | 17:00 |
| 2 | SECOND CC CONFERENCE | HEADQUARTERS A | 2006/4/10 | 15:00 | 16:00 |
| 3 | THIRD CC CONFERENCE | HEADQUARTERS B | 2006/4/20 | 15:00 | 17:00 |

FIG. 4

CONFERENCE PARTICIPANT INFORMATION MANAGEMENT TABLE

| CONFERENCE ID | USER ID |
|---:|---:|
| 1 | 1 |
| 1 | 2 |
| 1 | 3 |
| 1 | 4 |
| 1 | 5 |
| 2 | 1 |
| 2 | 2 |
| 2 | 3 |
| 2 | 5 |
| 2 | 7 |
| 3 | 1 |
| 3 | 2 |
| 3 | 4 |
| 3 | 6 |
| 3 | 8 |

FIG. 5

USER INFORMATION MANAGEMENT TABLE

| USER ID | NAME | DIVISION | JOB TITLE ID | SPECIALIZED FIELD |
|---|---|---|---|---|
| 1 | KOMADA | | 1 | |
| 2 | TAKAGI | ADMINISTRATION | 2 | |
| 3 | AKAZAWA | SALES | 2 | HW |
| 4 | MIDORIKAWA | SALES | 3 | SW |
| 5 | KOBAYASHI | QUALITY ASSURANCE | 2 | HW |
| 6 | MIZUNO | QUALITY ASSURANCE | 3 | SW |
| 7 | MABUCHI | DEVELOPMENT | 2 | HW |
| 8 | INUI | DEVELOPMENT | 3 | SW |
| 9 | NEKOTA | DEVELOPMENT | 3 | HW |
| 10 | TORIKAI | DEVELOPMENT | 4 | SW |
| 11 | USHIJIMA | DEVELOPMENT | 4 | HW |
| 12 | SARUTA | DEVELOPMENT | 4 | SW |

FIG. 6

JOB TITLE INFORMATION MANAGEMENT TABLE

| JOB TITLE ID | JOB TITLE | RANKING |
|---|---|---|
| 1 | PRESIDENT | A |
| 2 | GENERAL MANAGER | A |
| 3 | MANAGER | B |
| 4 | NO TITLE | B |

FIG. 7

TERMINOLOGY MANAGEMENT TABLE

| TERM ID | TERM | EXPLANATION | SPECIALIZED FIELD |
|---|---|---|---|
| 1 | XXX | NIGHTTIME SERVICE FOR PRODUCTION FIELD X | HW |
| 2 | YYY | SPECIALLY DESIGNED MODEL FOR Y BANK IN Y CITY IN Y PREFECTURE | HW |
| 3 | ABC | Activity-Based Costing : ONE OF THE COST CALCULATING METHODS..... | SW |
| 4 | DEF | Document Engineering Forum: ... | SW |

FIG. 8

SLIDE MANAGEMENT TABLE

| SLIDE ID | SLIDE TEXT | PROJECTION STARTING TIME |
|---|---|---|
| 1000 | REPORT ON A CORPORATION, DATE XX/XX, SUMMARY ... | 2006/4/1 15:08 |
| 1001 | ORGANIZATION CHART : CONTENTS OF A CHANGE IN THE SALES DIVISION ... | 2006/4/1 15:28 |
| 1002 | PROBLEMS : COST INCREASES IN XXX, RESOURCE SHORTAGE, AT DEF ... | 2006/4/1 15:35 |
| ... | ... | ... |

FIG. 9

MINUTES TEXT-NOTE INFORMATION MANAGEMENT TABLE

| CONFERE-NCE ID | NOTE ID | TEXT NOTE | INPUT TIME | SLIDE ID | SPEAKER USER ID | INPUT USER ID |
|---|---|---|---|---|---|---|
| 1 | 1 | COMPLAINT ABOUT TROUBLE IN ABC FROM A CORPORATION → REPLIED MARCH 30 | 2006/4/1 15:10 | 1000 | 2 | 2 |
| 1 | 2 | REPORT WEEKLY ON PROJECT Z | 2006/4/1 15:30 | 1001 | 6 | 2 |
| 1 | 3 | SALES DIVISION IS PLANNING ON MATTER X | 2006/4/1 16:00 | 1100 | 3 | 2 |
| 1 | 4 | DATA COLLECTION FOR MATTER X | 2006/4/1 16:03 | 1101 | | 3 |
| 2 | 5 | REVIEW OF TRADING WITH A CORPORATION | 2006/4/10 15:10 | 1200 | 3 | 2 |
| 2 | 6 | MATTER C PASSED | 2006/4/10 15:20 | 1210 | | 2 |
| 2 | 7 | MATTER D PASSED | 2006/4/10 15:30 | 1220 | | 2 |
| 3 | 8 | ADJUSTMENT OF THE PLAN ON MATTER X WITH THE DEVELOPMENT DIVISION | 2006/4/20 15:10 | 1400 | 4 | 2 |
| 3 | 9 | SUGGESTING THE NEXT PLAN FOR THE PROBLEM OF ZZZ IN PROJECT Z, LIKE YYY | 2006/4/20 15:30 | 1420 | | 2 |
| 3 | 10 | NEED TO REVIEW THE TRADING WITH A CORPORATION IS RAISED. REPORT IS REQUESTED ON THE DETAILS OF THE REPLIES TO COMPLAINTS ABOUT ABC | 2006/4/20 16:30 | 1423 | 1 | 2 |

FIG. 11

CONFERENCE SUMMARY

TITLE : MEETING ON SECURITY PROGRAM
VENUE : CONFERENCE ROOM A IN ROPPONGI, CONFERENCE ROOM 1 IN NAKAI
TIME: 1000-12:34
PARTICIPANTS : KENJI HAYAKAWA, TAKASHI GONDA, MICHIRU YAMABE,
THING WANG, DILBERT B.

OBJECTIVE : INFORMATION SHARING AND REVIEW OF PLANS
AGENDA :
1. EXPLANATION OF PROGRAM (YAMABE)
2. PROBLEMS AND REVIEW OF PLANS

| REFERENCE SLIDE | ACTION ITEM / COMMENT |
|---|---|
| SLIDE 4 | ACTION ITEM : WANT CD-ROMS BECAUSE OF BAD CONNECTION (WANG)<br>→ NOTED (GONDA) (REPLAY TIME 00:12)<br><br>WANT REPORT ON DETAILS OF COMPLAINTS ABOUT ABC (HAYAKAWA) |
| SLIDE 5 | ACTION ITEM : WHAT ARE THE ITEMS ON THE CHECK SHEET?(YAMABE)<br>→ IT WILL BE SENT LATER (GONDA) (REPLAY TIME 02 : 14)<br>ACTION ITEM : WANT TO ATTEND A ISMS STUDY MEETING (DILBERT)<br>→ NOTED (GONDA) (REPLAY TIME 01:14) |
| SLIDE 6 | WILL IT BE MORE APPEALING IF THERE IS A REFERENCE MATERIAL HAVING ACTUAL EXAMPLES IN THE COMPANY? (HAYAKAWA)(REPLAY TIME 00:34) |

FIG. 12

| CONFERENCE SUMMARY |  |
|---|---|
| TITLE : MEETING ON SECURITY PROGRAM<br>VENUE : CONFERENCE ROOM A IN ROPPONGI, CONFERENCE ROOM 1 IN NAKAI<br>TIME : 1000—12 : 34<br>PARTICIPANTS : KENJI HAYAKAWA, TAKASHI GONDA, MICHIRU YAMABE,<br>  THING WANG, DILBERT B. |  |
| OBJECTIVE : INFORMATION SHARING AND REVIEW OF PLANS<br>AGENDA :<br>1. EXPLANATION OF PROGRAM (YAMABE)<br>2. PROBLEMS AND REVIEW OF PLANS |  |
| REFERENCE SLIDE | ACTION ITEM / COMMENT |
| SLIDE 4 | ACTION ITEM : WANT CD—ROMS BECAUSE OF BAD<br>  CONNECTION (WANG)<br>  → NOTED (GONDA) (REPLAY TIME 00:12)<br>WANT REPORT ON DETAILS OF COMPLAINTS ABOUT<br>ABC (HAYAKAWA) |
| SLIDE 5 | ACTION IT{1. TERM ABC:ACTIVITY} THE CHECK<br>{2. MINUTES : FIRST CC CONFERENCE :<br>  COMPLAINT ABOUT ABC FROM A<br>  CORPORATION} GONDA)<br>ACTION IT{3. RESPONSE TO COMPLAINT} STUDY<br>  MEETING (DILBERT)<br>  → NOTED (GONDA) (REPLAY TIME 01:14) |
| SLIDE 6 | WILL IT BE MORE APPEALING IF THERE IS A REFERENCE<br>MATERIAL HAVING ACTUAL EXAMPLES IN THE<br>COMPANY? (HAYAKAWA)(REPLAY TIME 00:34) |

FIG. 13

```
FROM "NAOKO HIKAWA" <HIKAWA@XXXX.CO.JP>
TO    "KENJI HAYAKAWA" <HAYAKAWA@XXXX.CO.JP>,
      "TAKASHI GONDA" <GONDA@XXXX.CO.JP>,
      "MICHIRU YAMABE" <YAMABE@XXXX.CO.JP>
SUBJECT : MINUTES FOR DISTRIBUTION : MEETING ON SECURITY PROGRAM

CONFERENCE SUMMARY
_____
TITLE : MEETING ON SECURITY PROGRAM
VENUE : CONFERENCE ROOM A IN  ROPPONGI, CONFERENCE ROOM I IN  NAKAI
TIME: 1000-12:34
PARTICIPANTS : KENJI HAYAKAWA, TAKASHI GONDA, MICHIRU YAMABE,
               THING WANG, DILBERT B.
_____
OBJECTIVE : INFORMATION SHARING AND REVIEW OF PLANS
AGENDA :
1. EXPLANATION OF PROGRAM (YAMABE)
2. PROBLEMS AND REVIEW OF PLANS
```

| REFERENCE SLIDE | ACTION ITEM/COMMENT |
|---|---|
| SLIDE 4 | ACTION ITEM : WANT CD-ROMS BECAUSE OF BAD CONNECTION (WANG) → NOTED (GONDA) (REPLAY TIME 00 : 12) WANT REPORT ON DETAILS OF COMPLAINTS ABOUT ABC (HAYAKAWA) |
| SLIDE 5 | ACTION IT_____THE CHECK [MINUTES : FIRST CC CONFERENCE : COMPLAINT ABOUT ABC FROM A CORPORATION] GONDA) ACTION IT_____STUDY MEETING (DILBERT) → NOTED (GONDA) (REPLAY TIME 01 : 14) |
| SLIDE 6 | MINUTES : FIRST CC CONFERENCE : COMPLAINT ABOUT ABC FROM A CORPORATION |

REUSE

FIG. 16

```
                    ┌─────────────────┐
                    │ MINUTES EDITING │
                    └─────────────────┘
```

FROM "NAOKO HIKAWA" <HIKAWA@XXXX.CO.JP>
TO     "KENJI HAYAKAWA" <HAYAKAWA@XXXX.CO.JP>,
       "TAKASHI GONDA" <GONDA@XXXX.CO.JP>,
       "MICHIRU YAMABE" <YAMABE@XXXX.CO.JP>
SUBJECT : MINUTES FOR DISTRIBUTION : MEETING ON SECURITY
          PROGRAM
CONFERENCE SUMMARY

TITLE : MEETING ON SECURITY PROGRAM
VENUE : CONFERENCE ROOM A IN ROPPONGI, CONFERENCE ROOM I IN
        NAKAI
TIME : 1000-12:34
PARTICIPANTS : KENJI HAYAKAWA, TAKASHI GONDA, MICHIRU YAMABE,
               THING WANG, DILBERT B.

OBJECTIVE : INFORMATION SHARING AND REVIEW OF PLANS
AGENDA :
1. EXPLANATION OF PROGRAM (YAMABE)
2. PROBLEMS AND REVIEW OF PLANS

| REFERENCE SLIDE | ACTION ITEM / COMMENT |
|---|---|
| SLIDE 4 | ACTION ITEM : WANT CD.-ROMS BECAUSE OF BAD CONNECTION (WANG)<br>→ NOTED (GONDA) (REPLAY TIME 00:12)<br>WANT REPORT ON DETAILS OF COMPLAINTS ABOUT ABC (HAYAKAWA) |
| SLIDE 5 | ACTION I[MINUTES : FIRST CC CONFERENCE: COMPLAINT ABOUT ABC FROM A CORPORATION]S ON THE [ABE) TER (GONDA) (REPLAY TIME 02:14)<br>ACTION ITEM : WANT TO ATTEND A ISMS STUDY MEETING (DILBERT)<br>→ NOTED (GONDA) (REPLAY TIME 01:14) |
| SLIDE 6 | WILL IT BE MORE APPEALING IF THERE IS A REFERENCE MATERIAL HAVING ACTUAL EXAMPLES IN THE COMPANY? (HAYAKAWA)(REPLAY TIME 00:34) |

ADD PERSONAL NOTE

ADD SHARED NOTE

FIG. 18

MINUTES EDITING

FROM "NAOKO HIKAWA" <HIKAWA@XXXX.CO.JP>
TO    "KENJI HAYAKAWA" <HAYAKAWA@XXXX.CO.JP>,
      "TAKASHI GONDA" <GONDA@XXXX.CO.JP>,
      "MICHIRU YAMABE" <YAMABE@XXXX.CO.JP>
SUBJECT : MINUTES FOR DISTRIBUTION : MEETING ON SECURITY PROGRAM

CONFERENCE SUMMARY
―――――――
TITLE : MEETING ON SECURITY PROGRAM
VENUE : CONFERENCE ROOM A IN ROPPONGI, CONFERENCE ROOM I IN NAKAI
TIME : 1000 − 12 : 34
PARTICIPANTS : KENJI HAYAKAWA, TAKASHI GONDA, MICHIRU YAMABE,
               THING WANG, DILBERT B.
―――――――
OBJECTIVE : INFORMATION SHARING AND REVIEW OF PLANS
AGENDA :
1. EXPLANATION OF PROGRAM (YAMABE)
2. PROBLEMS AND REVIEW OF PLANS

| REFERENCE SLIDE | ACTION ITEM / COMMENT |
|---|---|
| SLIDE 4 | ACTION ITEM : WANT CD−ROMS BECAUSE OF BAD CONNECTION (WANG)<br>→ NOTED (GONDA) (REPLAY TIME 00:12)<br>WANT REPORT ON DETAILS OF COMPLAINTS ABOUT ABC (HAYAKAWA)<br>☐ NEED TO REVIEW THE MEASURES WITHIN THE GROUP<br>(GONDA) (REPLAY TIME 02:14) |
| SLIDE 5 | ACTION ITEM : WANT TO ATTEND A ISMS STUDY MEETING (DILBERT)<br>→ NOTED (GONDA) (REPLAY TIME 01:14) |
| SLIDE 6 | WILL IT BE MORE APPEALING IF THERE IS A REFERENCE MATERIAL HAVING ACTUAL EXAMPLES IN THE COMPANY? (HAYAKAWA)(REPLAY TIME 00:34)<br>☐ → ALREADY DONE IMMEDIATELY AFTER THE CONFERENCE (KANZAKI) |

RETURN    SEND

MINUTES PRODUCTION DEVICE, CONFERENCE INFORMATION MANAGEMENT SYSTEM AND METHOD, COMPUTER READABLE MEDIUM, AND COMPUTER DATA SIGNAL

CROSS-REFERENCE TO RELATED APPLICATIONS

This application is based on and claims priority under 35 USC 119 from Japanese Patent Application No. 2006-323649 filed Nov. 30, 2006.

BACKGROUND

1. Technical Field

The present invention generally relates to a minutes production device, and a conference information management system and a method, a computer readable medium, and a computer data signal.

2. Related Art

Documentation of the contents of conferences in the form of conference minutes often plays an important role in organizational activities. With the use of conference minutes during a conference, conference participants can smoothly ask and answer questions. Also, in a certain short period of time after the conference, the conference minutes are useful in studying the details of the conference and in acting on the decisions made in the conference. In the long run, the conference minutes forms a part of the memory of the organization and provides a clear record of goals and achievements of the organization.

SUMMARY

According to an aspect of the invention, there is provided a minutes production device including a producing unit that produces minutes, based on conference information, a recommending unit that searches a database and recommends information, based on the conference information used by the producing unit to produce the minutes, and an editing unit that edits the minutes, based on the information recommended by the recommending unit.

BRIEF DESCRIPTION OF THE DRAWINGS

Exemplary embodiments of the present invention will be described in detail based on the following figures, in which:

FIG. 3 shows the structure of a conference information management table;

FIG. 4 shows the structure of a conference participant information management table;

FIG. 5 shows the structure of a user information management table;

FIG. 6 shows the structure of a job title information management table;

FIG. 7 shows the structure of a terminology management table;

FIG. 8 shows the structure of a slide management table;

FIG. 9 shows the structure of a minutes text-note information management table;

FIG. 11 shows an example of the minutes editing screen;

FIG. 12 shows an example of the minutes editing screen where recommended information is displayed;

FIG. 13 shows an example of the minutes editing screen that is displayed on the user terminal through which the distribution of the minutes is requested;

FIG. 16 shows an example of a conference minutes reediting screen;

FIG. 18 shows an example of reedited conference minutes to which a text note made by the editor and supplementary information are added;

DETAILED DESCRIPTION

The following is a description of exemplary embodiments of the present invention, with reference to the accompanying drawings.

First Exemplary Embodiment

[Structure]

Figure 1:
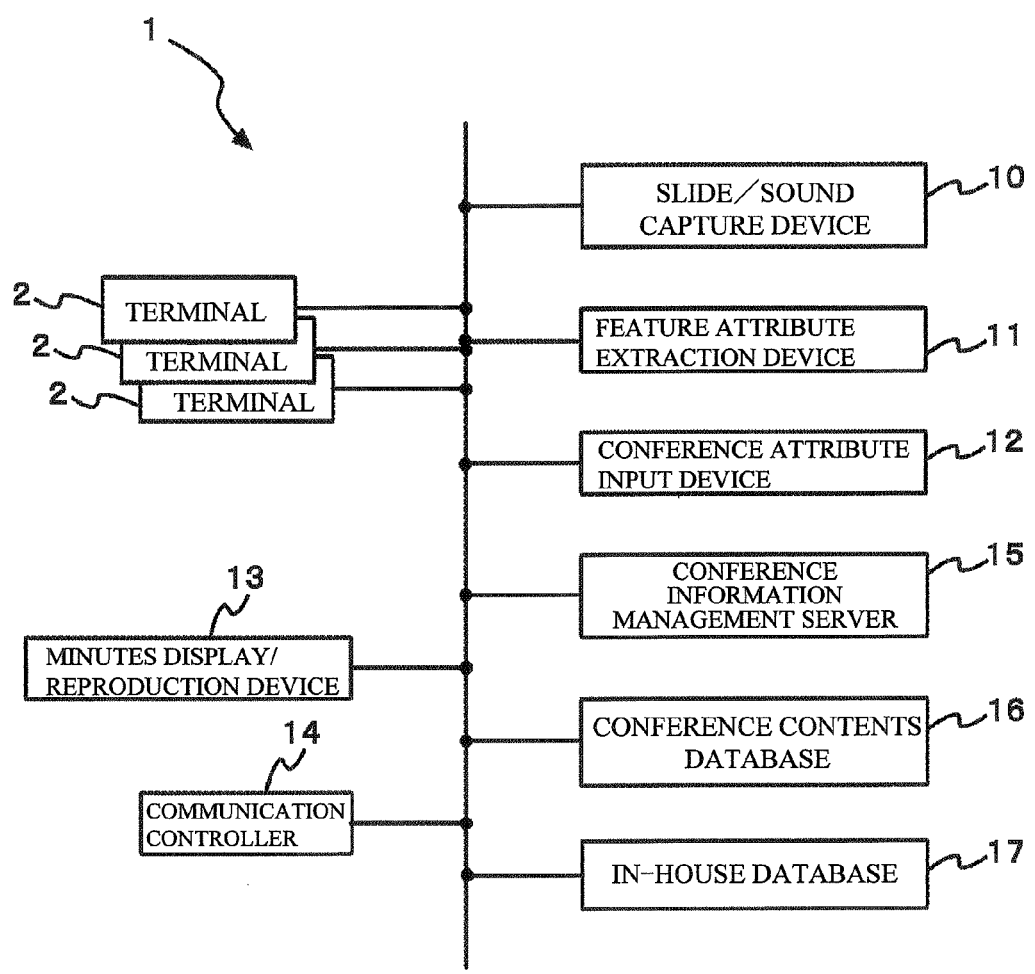
FIG. 1 illustrates the structure of a conference information management system.

Referring first to FIG. 1, the structure of this exemplary embodiment is described. A conference information management system 1 of this exemplary embodiment has a slide/sound capture device 10, a feature attribute extraction device 11, a conference attribute input device 12, a minutes display/reproduction device 13, a communication controller 14, a conference information management server 15, a conference contents database 16, and an in-house database 17 that are connected to a network such as a LAN. Terminals 2 such as personal computers (hereinafter referred to as PCs) may be connected to this conference information management system 1. The terminals 2 may be PCs that are installed in the conference room in advance, or PCs that are brought into the conference room by users.

The slide/sound capture device 10 captures a slide image projected on a screen, or a speech of a speaker input through a microphone. The captured slide image or sound is sent to the conference information management server 15. In the conference information management server 15, identification information is added to the slide image or sound, which is then stored in the conference contents database 16.

The feature attribute extraction device 11 extracts the feature attributes of the captured audio data or slide image. The feature attributes contain the slide projection starting time and ending time, the text character string contained in the slide image, the location (coordinates) of each word, the screen identifier for identifying the screen on which the slide image is projected in a case where the screen is one of the screens constituting a multi-screen (a multi-screen consists of more than one screens), the relationship between the slide and the location of the pointer indicated in the conference, and the sound duration in the audio data. The feature attribute data extracted by the feature attribute extraction device 11 is stored in the conference contents database 16.

The conference attribute input device 12 is a device to be used for inputting conference attribute information such as the title of the conference, the venue, the participants, and the agenda. Those pieces of information are to be input before by the user who serves as a recording secretary before the start of the conference.

The minutes display/reproduction device 13 causes the terminals 2 of users to display conference minutes that are produced by the conference information management server 15 and stored in the conference contents database 16.

The communication controller 14 is connected to an external network such as the Internet, so as to obtain information from outside server devices. Under the control of a display controller that is described later, the communication controller 14 also sends the conference minutes to user terminals connected via a network such as the Internet.

The conference information management server 15 produces the minutes of each conference. The conference information management server 15 also functions to distribute the produced conference minutes to terminals that have requested the conference minutes.

Figure 2:
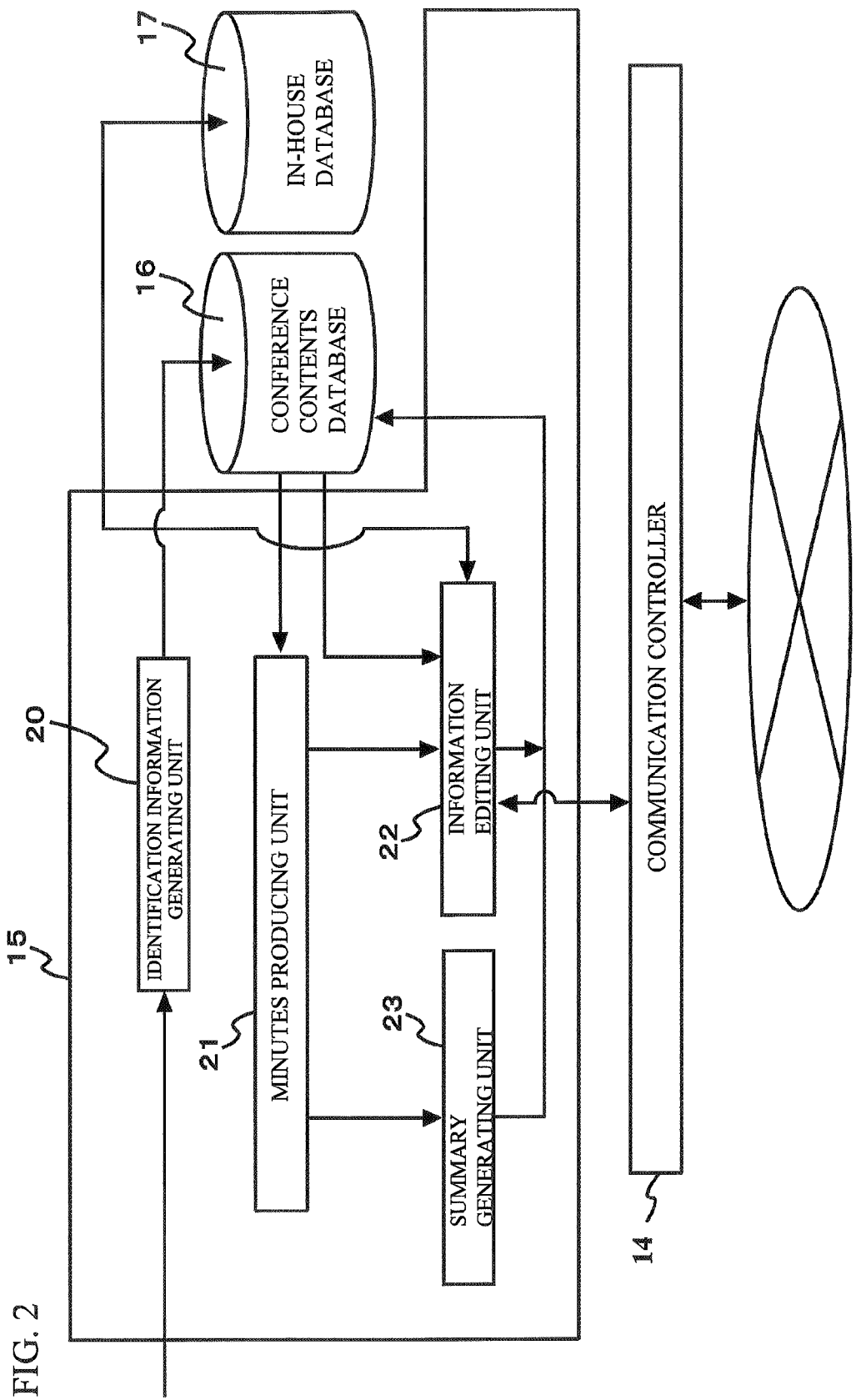
FIG. 2 illustrates the structure of a conference information management server.

FIG. 2 illustrates the structure of the conference information management server 15. The conference information management server 15 includes an identification information generating unit 20, a minutes producing unit (equivalent to the producing unit in the claims) 21, an information editing unit (equivalent to the recommending unit and the editing unit in the claims) 22, and a summary generating unit 23.

The identification information generating unit 20 adds identification information (ID) to a slide image or audio data captured by the slide/sound capture device 10, and stores the slide image or audio data, together with a conference ID for identifying the conference, in the conference contents database 16.

The minutes producing unit 21 produces the conference minutes, using the slide image data or audio data captured by the slide/sound capture device 10 and text data input through the terminals 2. The produced conference minutes is stored, together with the conference ID, in the conference contents database 16.

The information editing unit 22 adds supplementary information to the conference minutes produced by the minutes producing unit 21. The supplementary information is to supplement the contents of the minutes. The supplementary information is also stored, together with the conference ID, in the conference contents database 16. The information editing unit 22 will be described later in greater detail. The conference minutes edited by the information editing unit 22 and stored in the conference contents database 16 are distributed to the user terminals 2 by the minutes display/reproduction device 13.

The summary generating unit 23 produces a summary that contains only the essential parts of the conference. In doing so, the summary generating unit 23 may select keywords from text notes or the like contained in the conference minutes, and automatically produces a summary using only the parts containing those keywords. The summary generating unit 23 may also use audio information or the like.

The conference contents database 16 contains a conference information management table (see FIG. 3), a conference participant information management table (see FIG. 4), a user information management table (see FIG. 5), a job title information management table (see FIG. 6), a terminology management table (see FIG. 7), a slide management table (see FIG. 8), and a minutes text-note information management table (see FIG. 9). Each of the table is described below.

First, the conference information management table shown in FIG. 3 has each conference ID registered together with information as to a conference name, a venue, a date, a conference starting time, and a conference ending time.

The conference participant information management table shown in FIG. 4 is used for managing conference participants, and has each user ID registered together with a conference ID.

The user information management table shown in FIG. 5 has each user ID registered together with user information such as a user name, a division name, an ID indicating a job title, and a specialized field. The job title IDs are managed in the job title information management table shown in FIG. 6, in which each of the job title IDs is registered together with a job title and ranking information.

The terminology management table shown in FIG. 7 has each terminology ID registered together with information as to a term, explanation of the term, and the field of the term.

In the slide management table shown in FIG. 8, slide IDs allotted to captured slides are registered. Each of the slide IDs is registered together with text information seen in the slide, the time at which the slide is taken in, and the time at which the slide is projected.

The minutes text-note information management table shown in FIG. 9 has each conference ID registered together with an ID allotted to the corresponding text note, the text note, the input time, the slide ID allotted to the slide from which the text note is extracted, the ID allotted to the speaker, and the ID of the user who inputs the text note.

[Operation]

First, the user who serves as a recording secretary inputs the attribute information as the prior information of the conference, such as the title of the conference, the venue of the conference, the participants, the objective of the conference, and the agenda, through the conference attribute input device 12. The attribute information is registered, together with the conference ID for identifying the conference, in the conference contents database 16.

Figure 10:
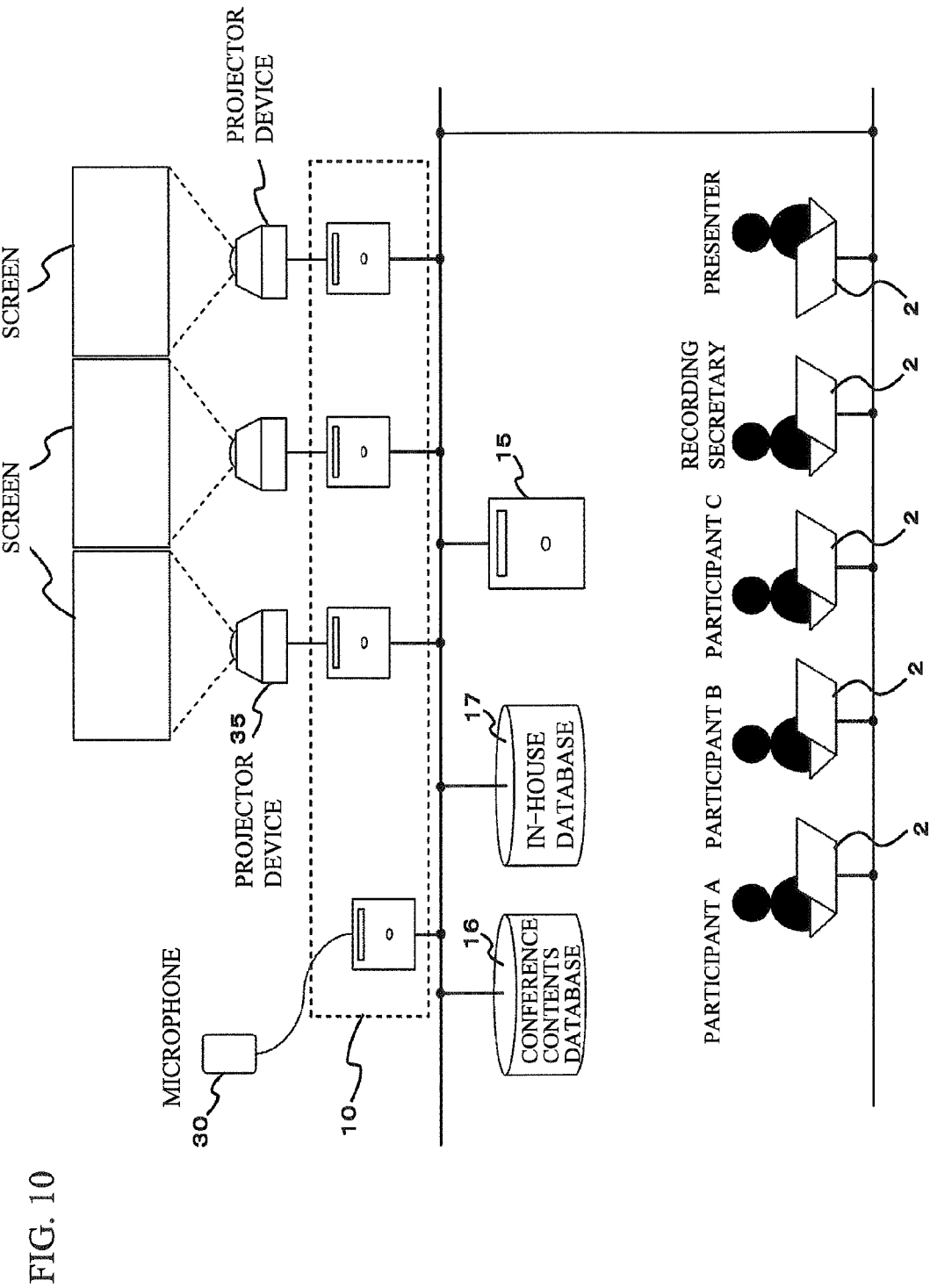
FIG. 10 shows the devices that are installed in the conference room.

FIG. 10 shows an example set of devices that are installed in a conference room. In the example shown in FIG. 10, three screens and three projector devices 35 that project an image on the screens are prepared in the conference room. The slide image projected by the projector devices 35 is captured by the slide/sound capture device 10. The slide/sound capture device 10 is connected to a network such as a LAN. The terminals 2 to be used by the participants taking part in the conference and the user serving as the recording secretary and the conference information management server 15 are also connected to the network.

The feature attribute extraction device 11 extracts feature attributes from the slide image captured by the slide/sound capture device 10. The conference information management server 15 then adds a slide ID to the slide image. Under the control of the conference information management server 15, the slide image associated with the slide ID is stored in the conference contents database 16. The timing of capturing the slide image may be determined by a switch operation by a user, or the slide image may be captured when a change in the projected image is caused by an image signal input through the projector devices 35.

Speeches by the participants in the conference are taken in by a microphone 30, and are sent from the slide/sound capture device 10 to the conference information management server 15. The conference information management server 15 adds an ID to the audio data, and stores the audio data, together with the corresponding conference ID, in the conference contents database 16.

The user serving as the recording secretary and the participants of the conference record text notes during the conference. The terminal (PC) 2 is prepared for each of the user serving as the recording secretary and the conference participants. The terminal to be used may be brought into the conference room and be connected to the conference information management system 1 by the user or the participant.

The user serving as the recording secretary or a conference participant first causes the terminal 2 to read recording media or the likes having personal information recorded thereon. By doing so, the personal information such as the user ID and the position are taken into the terminal 2. The obtained personal information is sent from the terminal 2 to the conference information management server 15, which conducts authentication of the user, so as to determine whether the user is allowed to participate in the conference. If the authentication is successful, the user may take notes during the conference and display a slide image, using the terminal 2.

When a text note is input by the user serving as the recording secretary or a conference participant during the conference, the terminal 2 adds the user ID, time information as to the time at which the text note is input, and the likes, to the input text note. The terminal 2 then sends the text note to the conference information management server 15. Text notes may be classified into shared notes that may be shared with the conference participants and personal notes that are used only by the recorder of each note. The attribute information that indicates whether the text note is a personal note or a shared note is also sent to the conference information management server 15.

Upon receipt of the text note, the attribute information, the user ID, the input time information, and the likes, from the terminal 2, the conference information management server 15 associates the information with the slide ID of the slide that has the latest capture time among the slides captured before the information is input. The information is then registered, together with the slide ID, in the conference contents database 16. The data to be stored in the conference contents database 16 are shown in FIGS. 3 through 9.

After the conference ends, the user serving as the recording secretary connects the terminal 2 to the conference information management server 15, and produces conference minutes, using the text notes that have been input during the conference and the slides that have been used during the conference. The user also sets distribution destinations to which the produced conference minutes is to be distributed. When the terminal 2 is connected to the conference information management server 15, authentication using the user ID, a password, and the likes, is conducted.

In the conference information management server 15, a template of conference minutes may be stored in advance. The conference information registered in the conference contents database 16 is put in the template by the conference information management server 15, and is displayed on the terminal 2 of the user serving as the recording secretary. The conference information contains slide images (or thumbnail images) captured during the conference, audio data, conference attribute information, and the likes. The user serving as the recording secretary produces the conference minutes by inputting action items and the text notes made during the conference into the conference minutes template that already has the slide images and the conference attribute information recorded therein. The conference minutes may be produced during the conference.

FIG. 11 shows an example of the conference minutes produced by the user serving as the recording secretary.

The conference attribute information, such as the title of the conference, the meeting venue, the conference starting time and ending time, the conference participants, the objective of the conference, and the agenda, is input to the conference minutes. Here, the information that is input through the conference attribute input device 12 before the conference may be used as the conference attribute information. As shown in FIG. 11, the thumbnails of the slide images captured by the slide/sound capture device 10, and action items and comments attached to the respective slides are produced. The action items are discussion items, requests, and suggestions that are made during or after the conference. The comments are the action (or measures) taken or to be taken in response to the respective action items.

In producing the conference minutes, the information editing unit 22 of the conference information management server 15 searches the conference contents database 16, the in-house database 17, and databases connected to an external network (such as the Internet), with the search keyword being the title of a text appearing in one of the slides displayed during the conference or the information as to the users set as the distribution destinations. By doing so, the information editing unit 22 retrieves the information related to the search keyword. The retrieved information is sent as recommended information to the terminal 2 of the user serving as the recording secretary. From the recommended information displayed on the terminal screen, the recording secretary selects information to be added as supplementary information, and adds the selected information to the conference minutes.

FIG. 12 shows a situation where the recommended information related to the text notes input by the user serving as the recording secretary is searched and displayed by the information editing unit 22. As the recommended information related to the text notes is displayed by the information editing unit 22, the user serving as the recording secretary selects information that appears to be necessary information from the recommended information, and adds the selected information as supplementary information to the conference minute (or embeds a link (equivalent to the location information in the claims) to the corresponding part of the conference minutes). Hereinafter, the information that is selected from the information recommended by the information editing unit 22 and is added to the minutes by the user serving as the recording secretary will be referred to as the supplementary information.

The information recommended by the information editing unit 22 contains information that aids the production of conference minutes and information that helps understanding the contents of the conference.

The information that aids the production of conference minutes are conference information such as audio data and slides that were used in the past, where the information as to a conference held in the past is used as the search keyword. The information that helps understanding the contents of the conference is a glossary of the terms used during the conference.

The data to be used as search keywords by the information editing unit 22 includes the title of the conference, the information as to the conference participants, the text data contained in the conference data, the character strings appearing in the slides contained in the conference data, and the information as to the distribution destinations of the conference data.

For example, in a case where the title of the conference is used as the search keyword, conference titles registered in the conference contents database 16 are searched, with the character string of the title being used as the search keyword. If there are the minutes of conferences such as regular meetings that were held in the past, the information editing unit 22 presents those minutes as the recommended information.

In a case where the search keyword is the name, the e-mail address, or the employee ID number of a conference participant, the information editing unit 22 searches an internal communication database (that is contained in the in-house database 17). From this database, the information editing unit 22 retrieves an electronic community to which the subject individual belongs and the contents of speeches and documents made in the community. The retrieved information is then displayed as the recommended information. If the subject individual has only recently joined the company or division, the related minutes in the past may be displayed.

Alternatively, it is possible to display the history of e-mail messages sent from the editing user to the users at the distribution destination, or the information as to the network of the conference participants and the users at the distribution destinations.

In a case where text information written in the minutes is used as the search keyword, the information editing unit 22 searches the internal/external abbreviation and terminology dictionaries (that are also contained in the in-house database 17) for the character string contained in the text information. Alternatively, text information may be retrieved from the minutes of conferences that were held in the past and have similar agenda as the agenda of the subject conference.

In a case where a character string contained in the captured slides is used as the search keyword, the information editing unit 22 searches the slides used in the minutes in the past and other internal documents, with the character string contained in the slides being the keys. The search results are then displayed.

The information to be registered as the recommended information in the conference minutes may be varied for each user at the transmission destinations. For example, if the names of the users at the transmission destinations are used as search keywords, the information retrieved as the recommended information varies accordingly. The user serving as the recording secretary selects the necessary recommended information for each of the users at the transmission destinations, and adds the selected information as the supplementary information to the conference minutes.

In a case where two or more search keywords are used to retrieve recommended information, the information editing unit 22 may perform weighting on the search keywords.

Where the user serving as the recording secretary uses information that is recommended based on all the keywords contained in the slides presented during the conference, for example, the recommended information includes too many things to provide desired information. To counter this problem, each user may designate the keyword in the conference or regions containing the keyword in the slide images, using a mouse or the like. By doing so, the weighted keywords may be sent to the conference information management server 15, and the desired information may be more easily provided.

When a user (a reediting user) that has received the minutes reedits the minutes to be loaded to another user, important keywords are clicked with a mouse, so that the weighted keywords may be transmitted in response to a recommendation service. Accordingly, users may receive recommendations highly relevant to the focused points, and the information related to the important aspects to be transmitted may be readily added to the minutes.

The user serving as the recording secretary (the editor) may determine how to display supplementary information added to the conference minutes. For example, another user who reads the conference minutes clicks a slide, so as to display supplementary information. Alternatively, when a text in the conference minutes is selected, the corresponding supplementary information may be displayed. Supplementary information may be displayed from the start when the conference minutes are released. In a case where there are two or more pieces of supplementary information for one keyword in the conference minutes, the user serving as the recording secretary may set the display order (the display priority) for supplementary information.

When displaying the retrieved recommended information on the terminal 2 of the user serving as the recording secretary, the conference information management server 15 selectively displays the retrieved recommended information in accordance with the security level that is set for the retrieved recommended information.

For example, in a case where the job title of the speaker of a speech (text data) to be added as recommended information is higher in rank than the job title of the user serving as the recording secretary, and the user serving as the recording secretary does not participate in the conference, the user serving as the recording secretary is determined not to have the right to access to the information having a high security level, and release of the recommended information to the user serving as the recording secretary is prohibited.

Likewise, when the minutes having supplementary information added thereto are transmitted to the user terminals 2 and are released to the users, the release of information may be controlled based on the job title ID of each recipient user. In a case where the job title of the speaker of a speech (text data) to be added as recommended information is higher in rank than the job title of a recipient user, and the recipient user does not participate in the conference, the recipient user is determined not to have the right to access to the information having a high security level, and release of the recommended information to the recipient user is prohibited.

The above two methods may be combined so that the user serving as the recording secretary or a conference participant may select and display the recommended information that can be referred to at the distribution destinations (recipient users) among the supplementary information provided by the conference information management server 15 at the time of production or editing of the minutes.

After the minutes producing unit 21 produces the minutes and the information editing unit 22 adds the supplementary information to the conference minutes, a mail distributing unit 51 (described in detail later) produces an e-mail message containing the URL at which the minutes can be accessed. The e-mail is then sent to the preset mail addresses. FIG. 13 shows an example of the conference minutes to be sent to users.

Figure 14A:
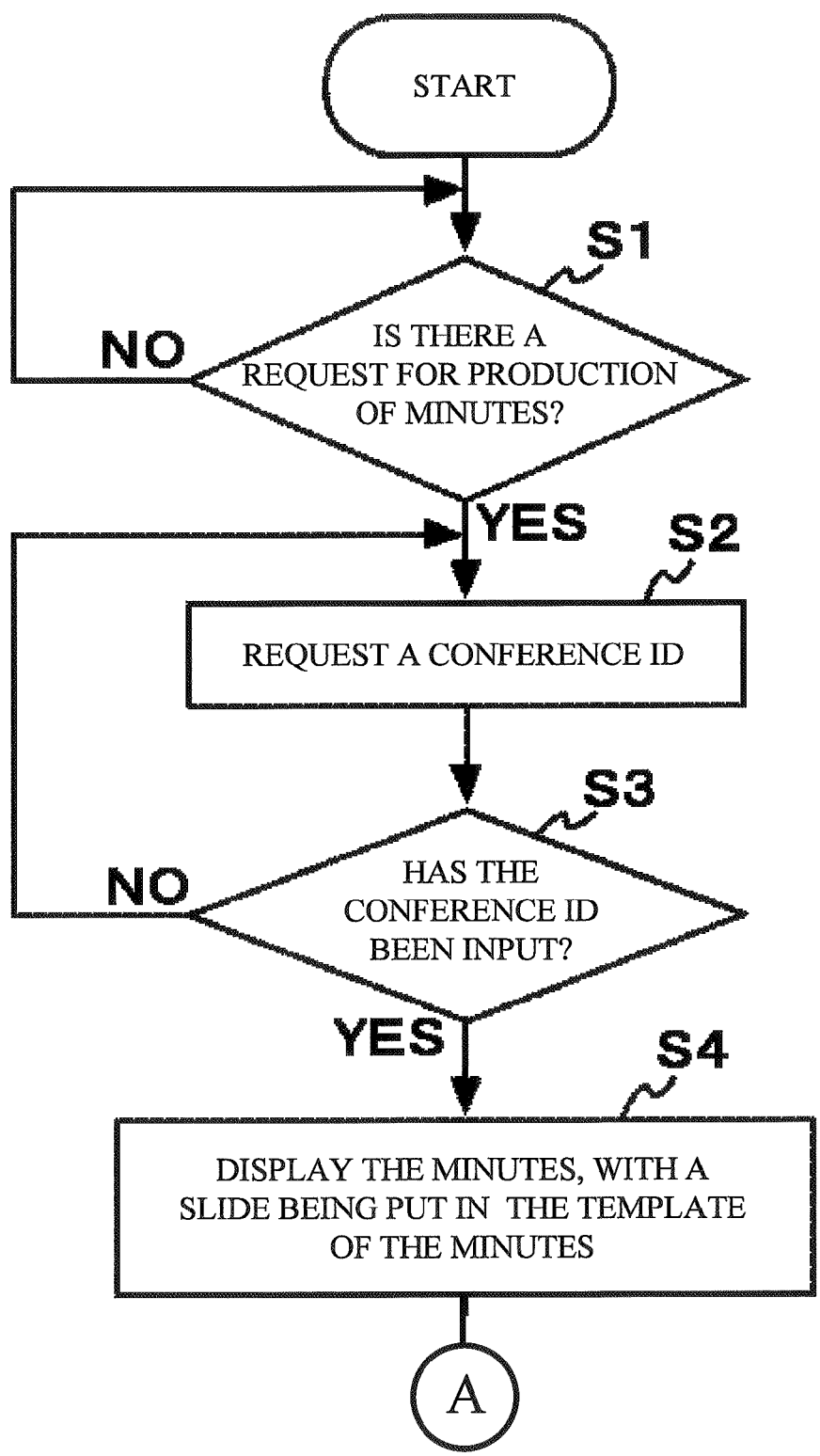
FIG. 14A and FIG. 14B are a flowchart of an operation to be performed by the conference information management server.
Figure 14B:
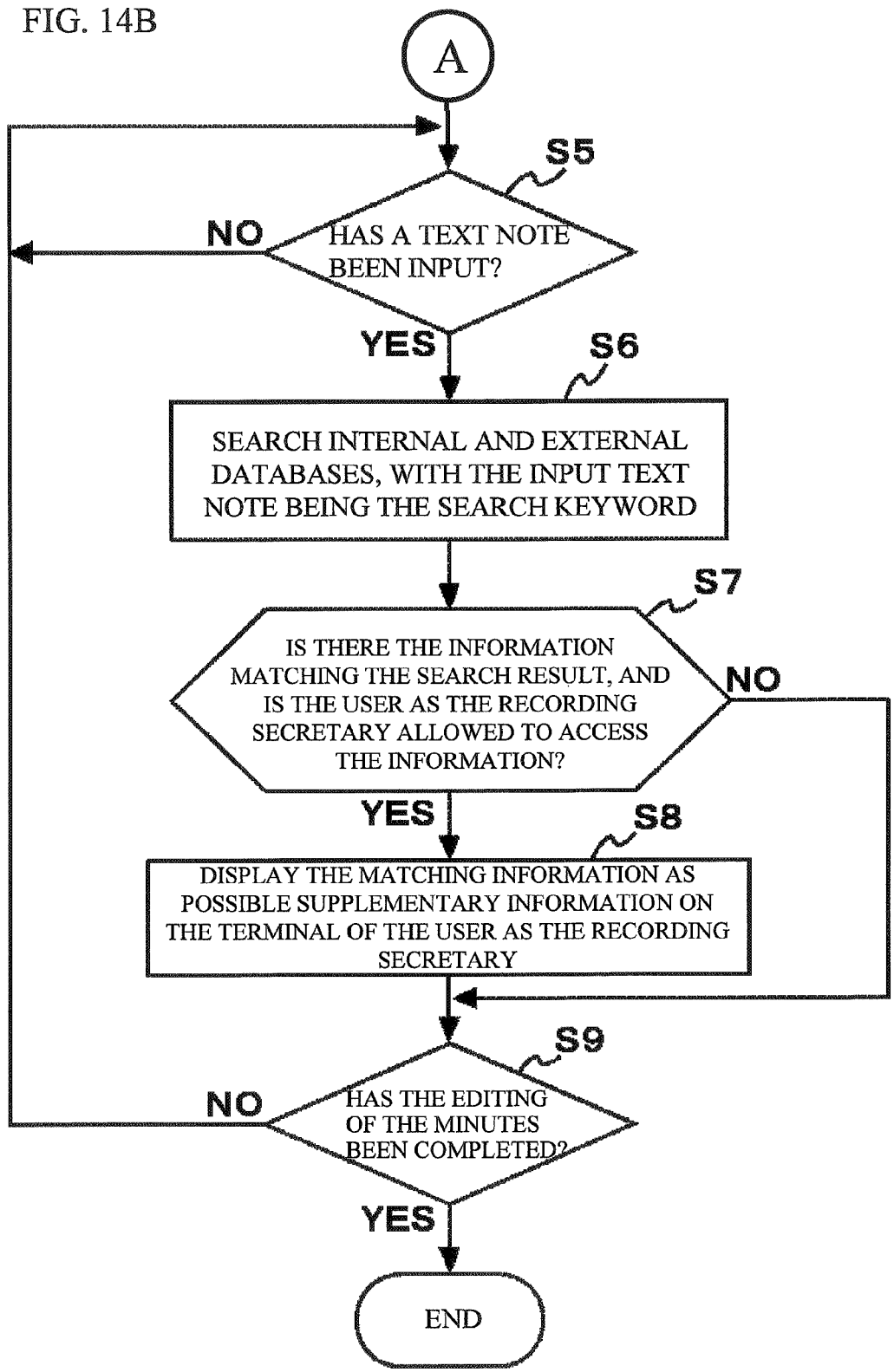

Referring now to the flowchart shown in FIG. 14A and FIG. 14B, the operation of the conference information management server 15 is described. When receiving a conference minutes producing request from the user terminal 2 (step S1), the conference information management server 15 requests the user terminal 2 to input the conference ID (step S2). The conference information management server 15 may also requests the user terminal 2 to input the user ID for identifying the user. When the conference ID is input ("YES" in step S3), the conference information management server 15 causes the terminal of the recording secretary to display the template of the minutes to which the slides used in the conference are added (step S4). When a text note is input from the user terminal ("YES" in step S5), the conference information management server 15 searches the conference contents database 16, the in-house database 17, and databases connected to an external network or the like, using the input text note as the search keyword (step S6). If there is information related to the search keyword and the subject user is allowed to have access to the information ("YES" in step S7), related information is displayed as recommended information on the terminal of the user serving as the recording secretary (step S8). The above procedures are repeated to produce the conference minutes. When the conference minutes are completed ("YES" in step S9), the conference information management server 15 ends the operation.

Second Exemplary Embodiment

Next, a second exemplary embodiment of the present invention is described, with reference to the accompanying drawings.

In this exemplary embodiment, a conference participant who has received an e-mail message reedits conference minutes obtained from the conference contents database 16, and sends the reedited conference minutes to a new user.

Figure 15:
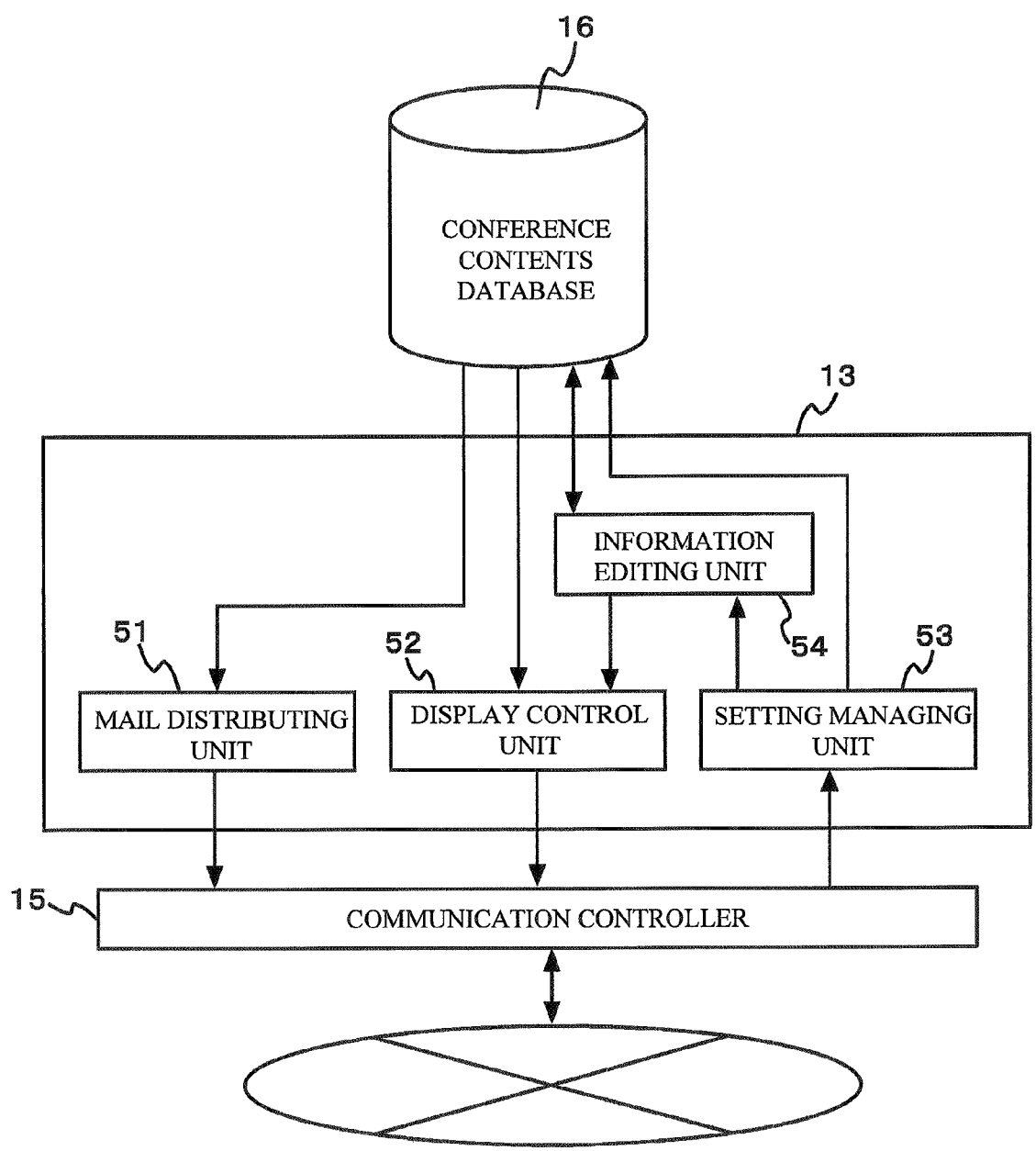
FIG. 15 illustrates the structure of the minutes display/reproduction device.

FIG. 15 shows the structure of the minutes display/reproduction device 13 that causes the terminal 2 of the user to display the conference minutes. The minutes display/reproduction device 13 includes a mail distributing unit 51, a display controlling unit 52, a setting managing unit 53, and an information editing unit 54.

After the conference minutes are produced by the minutes producing unit 21 and are stored in the conference contents database 16, the mail distributing unit 51 produces an e-mail message containing the URL at which the minutes can be accessed, and sends the e-mail message to the preset mail addresses.

When the URL written in the e-mail message is selected, and a request for distribution of the conference minutes is made from the terminal 2 of the user, the display controlling unit 52 performs a control operation so that the conference minutes registered in the conference contents database 16 is displayed on the terminal 2 of the user who has requested the distribution of the conference minutes.

The setting managing unit 53 receives edited data of the conference minutes that are edited and sent from the terminal 2 displaying the conference minutes under the control of the display controlling unit 52. The identification information such as the conference ID and the user ID is added to the edited data, and the edited data is stored in the conference contents database 16. Accordingly, two or more sets of conference minutes are registered under the same conference ID in the conference contents database 16. When text data is input through a user terminal or conference information is selected, the setting managing unit 53 transfers the information to the information editing unit 54.

The information editing unit 54 searches the conference contents database 16, with the search keyword being the text data input through the user terminal 2 or the text data contained in the selected conference information. The information editing unit 54 then causes the user terminal 2 to display the recommended information related to the search keyword. Like the information editing unit 22, the information editing unit 54 may also search a database in an external network such as the Internet for the recommended information.

In the conference minutes to be distributed to the conference participants by the mail distributing unit 51, a URL at which a reediting screen is displayed is embedded. The URL contains the character string that identifies the minutes ID allotted to the conference minutes.

When a conference participant who has received the minutes via e-mail presses a reedit button contained in the e-mail, the reuse URL is selected. As the reuse URL is selected, the conference information management server 15 causes the user terminal 2 to display the minutes editing screen (see FIG. 13).

When the reuse URL is selected, the display controlling unit 52 causes the user terminal 2 to display a conference minutes editing screen shown in FIG. 16.

Figure 17:
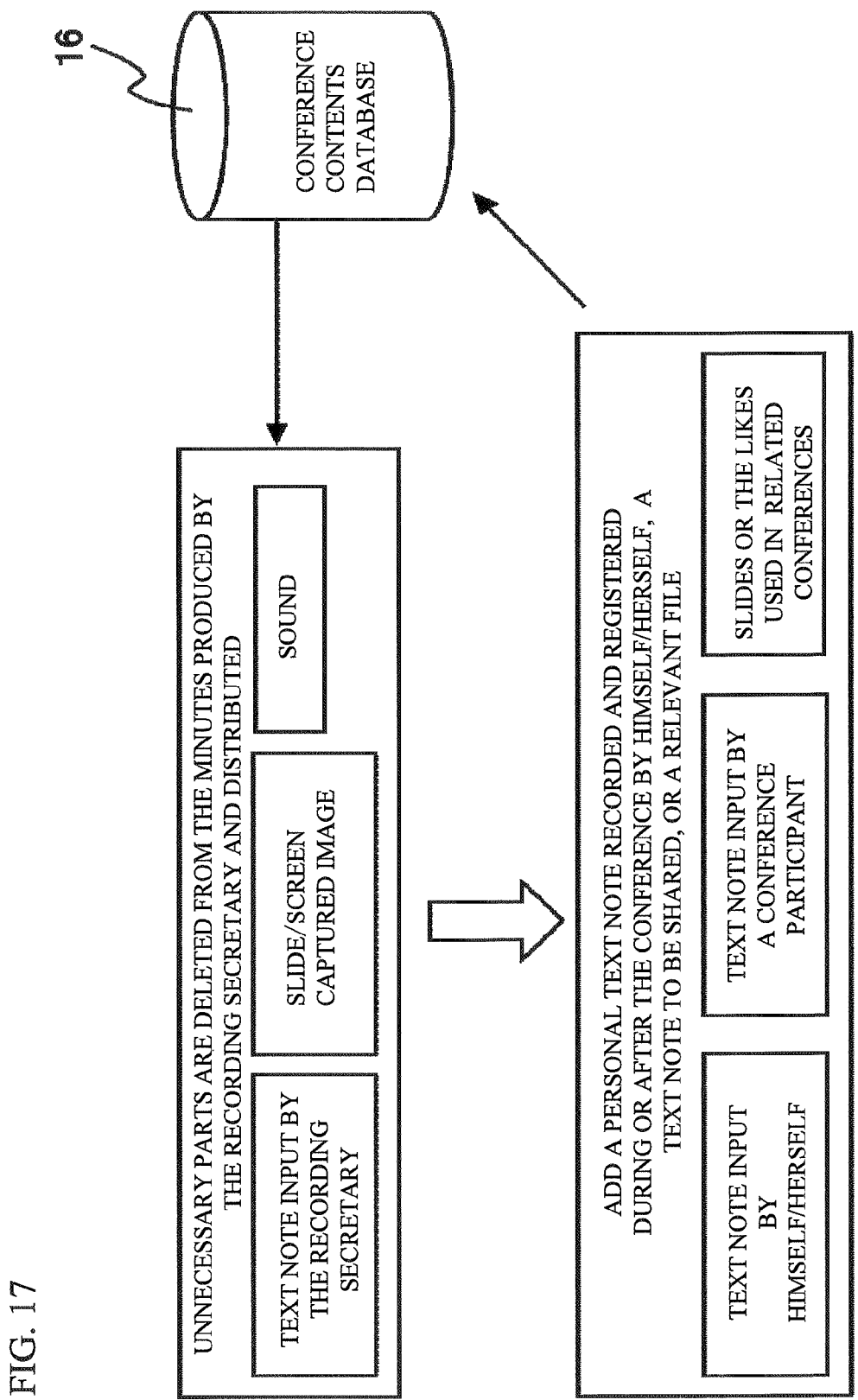
FIG. 17 shows a summary of reediting of conference minutes.

The conference participant inputs his/her own user ID through the terminal 2, so as to obtain his/her conference notes and the shared text notes registered in the conference contents database 16. For example, when a note addition button provided on the editing screen shown in FIG. 16 is pressed, the terminal 2 transmits the ID information of the user to the minutes display/reproduction device 13, and issues a request for text notes. After obtaining his/her conference notes and the shared text notes from the minutes display/reproduction device 13, the conference minutes are reedited with the use of the information. Here, among the supplementary information added by the user serving as the recording secretary, only necessary data selected by the conference participant is used. Also, with the search keyword being the text note selected by the user reediting the minutes, the information editing unit 54 newly adds recommended information of the text note. FIG. 17 shows a summary of the reedited minutes, and FIG. 18 shows the conference minutes having the selected recommended information and the supplementary information added thereto.

The setting managing unit 53 receives the edited data of the conference minutes transmitted from the user terminal 2, and stores the edited data, together with the identification ID, in the conference contents database 16. Other than the edited data, the setting information as to the distribution destinations to which the conference minutes are to be distributed is transmitted from the user terminal 2 to the setting managing unit 53.

The mail distributing unit 51 produces an e-mail message containing the URL at which the reedited conference minutes can be accessed, and sends the e-mail to the preset e-mail addresses of users.

The text note to be added to the conference minutes by the conference participant is a text note that is produced after the request for transfer of the conference minutes or is produced during the conference, and may not be registered in the conference contents database 16.

The conference participant opens the conference minutes reediting screen, and registers a locally stored text note in the conference contents database 16. The information editing unit 54 then adds the text note transmitted from the terminal 2 of the conference participant as the recommended information to the displayed editing screen. The recommended information selected by the user is then added as supplementary information to the conference minutes.

Figure 19:
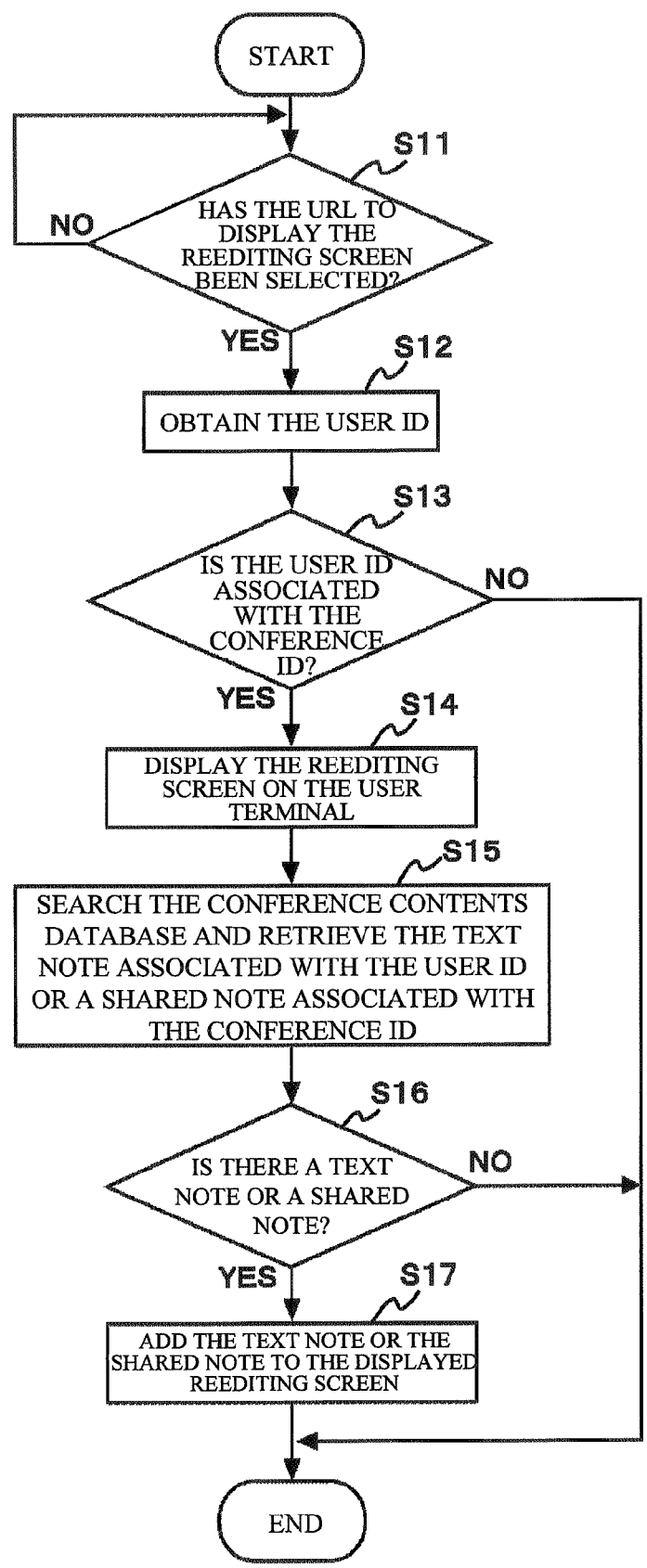
FIG. 19 is a flowchart showing the procedures for displaying a text note and a shared note on a user terminal.

Referring now to the flowchart shown in FIG. 19, the procedures for causing the user terminal 2 to display a text note or a shared note are described.

When the URL at which the reediting screen is displayed is input through the user terminal 2 ("YES" in step S11), the conference information management server 15 requests a user ID for identifying the user from the user terminal 2 that has made an access (step S12). When the user inputs the user ID, the input user ID is determined whether to be associated with the conference ID, with the conference participant information management table being referred to. If the user ID is associated with the conference ID ("YES" in step S13), the conference information management server 15 causes the user terminal 2 to display the reediting screen (step S14). The conference information management server 15 then searches the conference contents database 16 so as to retrieve the text notes associated with the user ID and the shared notes associated with the conference ID (step S15). If the text notes associated with the user ID and the shared notes associated with the conference ID are retrieved ("YES" in step S16), the conference information management server 15 has the text notes and the shared notes added to the reediting screen displayed on the user terminal 2 (step S17).

Figure 20:
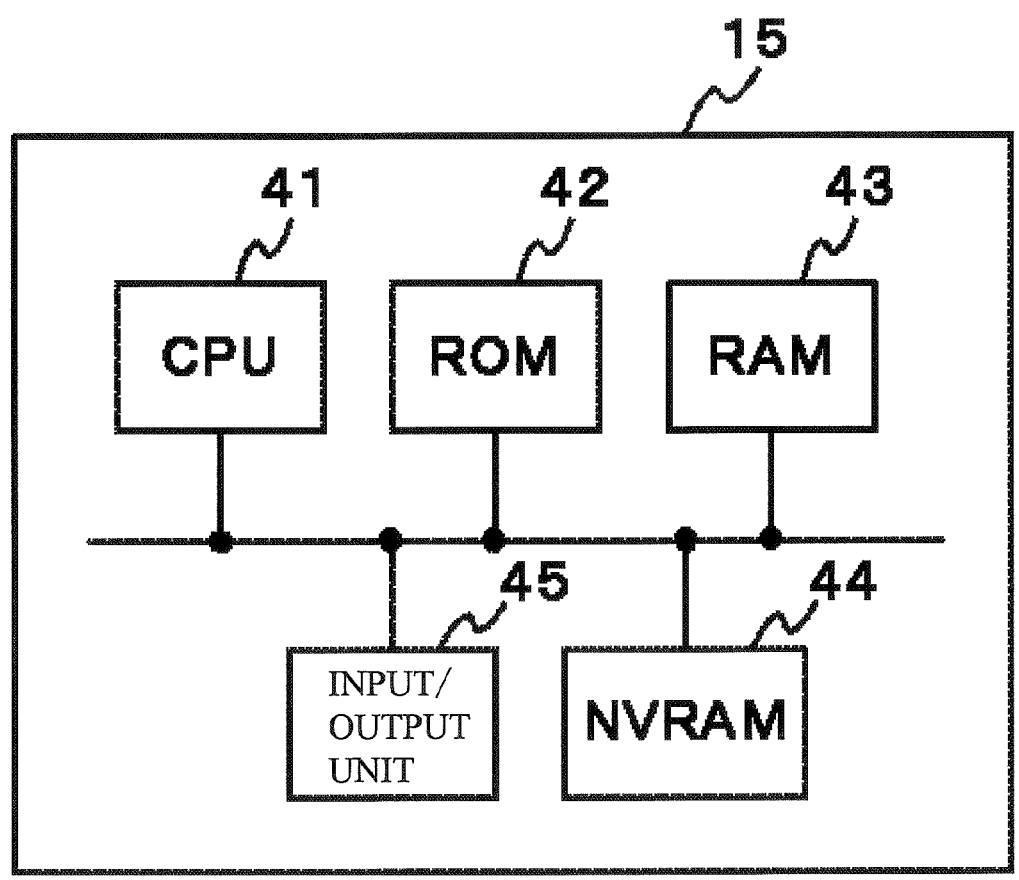
FIG. 20 illustrates a hardware structure where the conference information management server is embodied through software control.

The above described conference information management server 15 may be embodied through software control. FIG. 20 shows a structure where the conference information management server 15 is embodied through software control. As shown in FIG. 20, the conference information management server 15 includes a CPU 41, a ROM 42, a RAM 43, a NVRAM 44, and an input/output unit 45. The CPU 41 reads a program stored in the ROM 42. The CPU 41 then performs an operation in accordance with the program, so as to perform the control operation in the order shown in the above-described flowchart. The data showing operation results and print end page information are written in the RAM 43. The data that needs to be stored when the power is turned off among the data written in the RAM 43 is written in the NVRAM 44.

The program stored in the ROM 42 may be a program that is read from a recording medium such as a CD-ROM and is then stored in the NVRAM 44. Alternatively, a program transmitted via a communication network may be received by the input/output unit 45 and be then stored in the NVRAM 44. The program may be described by a computer data signal embodied in a carrier wave for enabling a computer to perform a process composed of steps.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents. For example, the minutes display/reproduction device 13 distributes conference minutes to the user terminals 2 in the above described exemplary embodiments. However, the conference information management server 15 may be designed to have the function of the minutes display/reproduction device 13 (in other words, the display control unit in the claims is embodied by the conference information management server 15).

What is claimed is:

1. A minutes production device comprising: a producing unit that produces, from conference information of a conference, minutes of the conference;
    a recommending unit that receives a keyword from among the conference information, searches a database for supplementary information that is related to the keyword, and returns the supplementary information as a result of the database search;
    an editing unit that adds the supplementary information to the minutes of the conference, the minutes of the conference to which the supplementary information is added being supplemented minutes of the conference;
    a conference contents display area that displays contents of the conference;
    a minutes display area that displays the supplemented minutes of the conference; and
    a memory that stores the supplemented minutes of the conference edited by the editing unit,
    wherein the minutes of the conference are a summary of the conference information of the conference, and
    wherein the editing unit includes an embedding unit that embeds location information in the supplemented minutes, the location information indicating a location at which the supplementary information returned by the recommending unit can be obtained.

2. The minutes production device according to claim 1, wherein the minutes of the conference are associated with the supplementary information that is selected by a selection inputting unit from the supplementary information returned by the recommending unit, and the minutes of the conference associated with the supplementary information are stored in the memory.

3. The minutes production device according to claim 1, wherein the editing unit embeds the location information in a predetermined position in the supplemented minutes.

4. The minutes production device according to claim 1, further comprising: a memory unit that has a conference note stored therein, the conference note being made at least during a conference or after the conference,
    wherein the recommending unit searches the database using the keyword obtained from the conference note in response to an input of the keywords, and returns the supplementary information as a result of the database search.

5. The minutes production device according to claim 1, wherein the recommending unit searches the database using the keyword obtained from user information that is set at a transmission destination of the minutes, and returns the supplementary information as a result of the database search.

6. The minutes production device according to claim 4, wherein the supplementary information returned by the recommending unit contains at least one of data for aiding production of the supplemented minutes and data for helping understanding the contents of the conference.

7. The minutes production device according to claim 1, wherein the recommending unit selectively recommends the supplementary information, based user information for allowing reference to the supplementary information and attribute information as to a user who produces the supplemented minutes of the conference using the minutes production device, the user information and the attribute information being set in the supplementary information.

8. The minutes production device according to claim 1, wherein the supplementary information comprises first supplementary information and second supplementary and the recommending unit adds one of the first supplementary information and the second supplementary information to the minutes of the conference based on a weighting.

9. The minutes production device according to claim 1, further comprising:
    a display control unit that causes a user terminal to display the supplemented minutes, when a request for distribution of the minutes of the conference is made through the user terminal.

10. The minutes production device according to claim 9, wherein, when causing the user terminal to display the supplemented minutes, the display control unit causes the user terminal to selectively display the supplementary information, based on user information for allowing reference to the supplementary information and attribute information as to a user who inputs the request through the user terminal, the user information and the attribute information being set in the supplementary information.

11. The minutes production device according to claim 9, wherein, when predetermined data is selected from the minutes of the conference, the display control unit obtains the supplementary information associated with the keyword from the database, and causes the user terminal to display the supplementary information.

12. The minutes production device according to claim 9, wherein, when receiving a request for reediting of the supplemented minutes displayed on the user terminal, the recommending unit obtains a conference note made by a user using the user terminal and stored in the memory, based on identification information as to the user, the recommending unit searches the database and returns second supplementary information based on the conference note.

13. The minutes production device according to claim 9, wherein, when receiving a request for reediting of the supplemented minutes displayed on the user terminal, the recommending unit searches the database and returns second supplementary information, based on text data in conference information contained in the supplemented minutes.

14. The minutes production device according to claim 9, wherein, when receiving a request for reediting of the supplemented minutes displayed on the user terminal, the recommending unit searches the database and returns second supplementary information, based on user information that is set at a transmission destination to which reedited minutes are to be transmitted.

15. The minutes production device according to claim 1, wherein the recommending unit searches the database, with the keyword being at least one item selected from among a title of a conference, information as to a participant of the conference, text data contained in the conference information, a character string in a slide image contained in the conference information, and information as to a distribution destination of the minutes.

16. The minutes production device according to claim 1, wherein the conference information contains at least one item selected from among image data obtained by capturing a slide image used in a conference, audio data obtained by recording sound during the conference, and a conference note that is input at least during the conference or after the conference.

17. The minutes production device according to claim 7, wherein the supplementary information returned by the recommending unit contains at least one item selected from among slide data, audio data, and text data that are produced in conferences in the past.

18. A conference information management system comprising: a minutes production device comprising:
  a producing unit that produces, from conference information of a conference that includes a slide of the conference, minutes of the conference;
  a recommending unit that searches a database using a keyword, the keyword comprising text information in the slide of the conference, and recommends supplementary information to be added to the minutes of the conference as a result of the database search, the supplementary information comprising the information searched for by the recommending unit that is related to the keyword;
  an editing unit that adds the supplementary information returned by the recommending unit to the minutes of the conference, the minutes of the conference to which the supplementary information is added being supplemented minutes of the conference; and
  a memory that stores the supplemented minutes of the conference edited by the editing unit; and
  a minutes distribution device that distributes the supplemented minutes of the conference to a user terminal,
  wherein the editing unit includes an embedding unit that embeds location information in the supplemented minutes, the location information indicating a location at which the supplementary information returned by the recommending unit can be obtained.

19. The conference information management system according to claim 18, wherein:
  when receiving a request for reediting of the supplemented minutes displayed on the user terminal, the recommending unit obtains a conference note made by a user using the user terminal from at least one of the memory and the user terminal, based on identification information as to the user, the recommending unit searching the database and recommending second supplementary information based on the conference note; and
  the minutes distribution device distributes the supplemented minutes that are reedited by the editing unit based on the second supplementary information recommended by the recommending unit, to a distribution destination designated through the user terminal.

20. The conference information management system according to claim 18, wherein:
  when receiving a request for reediting of the supplemented minutes displayed on the user terminal, the recommending unit searches the database using text data in conference information contained in the supplemented minutes, and returns the second supplementary information as a result of the database search; and
  the minutes distribution device distributes the supplemented minutes that are reedited by the editing unit based on the second supplementary information recommended by the recommending unit, to a distribution destination designated through the user terminal.

21. The conference information management system according to claim 18, wherein:
  when receiving a request for reediting of the supplemented minutes displayed on the user terminal, the recommending unit searches the database and recommends second supplementary information, based on user information that is set at a distribution destination to which reedited minutes are to be distributed; and
  the minutes distribution device distributes the supplemented minutes reedited by the editing unit based on the second supplementary information recommended by the recommending unit, to the distribution destination designated through the user terminal.

22. A tangible computer readable recording medium storing a program, which when executed by a computer, causes the computer to execute a process for: producing minutes of a conference from conference information of a conference that includes a slide of the conference;
  searching a database using a keyword for information related to the keyword, the keyword comprising text information in the slide of the conference, and recommending supplementary information to be added to the minutes of the conference as a result of the database search, the supplementary information comprising the information searched for as a result of the searching that is related to the keyword;
  editing the minutes of the conference to add the recommended supplementary information to the minutes of the conference; and
  embedding location information in the supplemented minutes, the location information indicating a location at which the supplementary information returned by the recommending can be obtained.

23. A method of producing minutes of a conference, the method comprising: producing minutes of a conference from conference information of a conference that includes a slide of the conference;
  searching a database using a keyword for information related to the keyword, the keyword comprising text information in the slide of the conference, and recommending supplementary information to be added to the minutes of the conference as a result of the database search, the supplementary information comprising the information searched for as a result of the searching that is related to the keyword;

editing the minutes of the conference to add the recommended supplementary information to the minutes of the conference; and embedding location information in the supplemented minutes, the location information indicating a location at which the supplementary information returned by the recommending can be obtained.

24. The minutes production device according to claim 1, further comprising a display area that displays the supplementary information.

25. The minutes production device according to claim 1, wherein the conference contents display area includes a thumbnail display area that displays the slides in thumbnail form.

26. A minutes production device comprising: a production unit that produces minutes of a conference from conference information of a conference that includes a slide of the conference;

a recommending unit that searches a database using a keyword obtained from the conference information for information related to the keyword, the keyword comprising text information in the slide of the conference, and recommends supplementary information to be added to the minutes of the conference as a result of the database search, the supplementary information comprising the information searched for by the recommending unit that is related to the keyword;

an editing unit that adds the supplementary information recommended by the recommending unit to the minutes of the conference, the minutes of the conference to which the supplementary information is added being supplemented minutes of the conference; and a memory that stores the supplemented minutes of the conference edited by the editing unit, wherein the minutes of the conference are a summary of the conference information of the conference, and wherein the editing unit includes an embedding unit that embeds location information in the supplemented minutes, the location information indicating a location at which the supplementary information returned b the recommending unit can be obtained.

* * * * *